(12) United States Patent
Park et al.

(10) Patent No.: US 11,399,216 B2
(45) Date of Patent: Jul. 26, 2022

(54) ELECTRONIC APPARATUS AND CONTROLLING METHOD THEREOF

(71) Applicant: Samsung Electronics Co., Ltd., Suwon-si (KR)

(72) Inventors: Jihun Park, Suwon-si (KR); Myungjae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 16/534,298

(22) Filed: Aug. 7, 2019

(65) Prior Publication Data

US 2020/0120395 A1  Apr. 16, 2020

(30) Foreign Application Priority Data

Oct. 16, 2018  (KR) .......................... 10-2018-0122968

(51) Int. Cl.
| | |
|---|---|
| *H04N 21/482* | (2011.01) |
| *G10L 15/22* | (2006.01) |
| *H04N 21/422* | (2011.01) |
| *H04N 21/475* | (2011.01) |
| *H04N 21/4722* | (2011.01) |

(52) U.S. Cl.
CPC ......... *H04N 21/4826* (2013.01); *G10L 15/22* (2013.01); *H04N 21/42203* (2013.01); *H04N 21/475* (2013.01); *H04N 21/4722* (2013.01); *H04N 21/4821* (2013.01); *H04N 21/4828* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 8,495,679 B2 * | 7/2013 | Labeeb | H04N 7/163 |
| | | | 725/46 |
| 8,660,849 B2 | 2/2014 | Gruber et al. | |
| (Continued) | | | |

FOREIGN PATENT DOCUMENTS

| | | |
|---|---|---|
| JP | 2018-505491 | 2/2018 |
| JP | 2018-81185 | 5/2018 |
| (Continued) | | |

OTHER PUBLICATIONS

Extended Search Report dated Jan. 31, 2020 in counterpart European Application No. 19191978.6.

*Primary Examiner* — Ricky Chin
(74) *Attorney, Agent, or Firm* — Nixon & Vanderhye P.C.

(57) ABSTRACT

Disclosed is an electronic apparatus. The electronic apparatus includes a memory and a processor configured to control the electronic apparatus to, based on a plurality of intent analysis results in relation to text information corresponding to a user voice being obtained, generate a user interface (UI) including a plurality of guide information corresponding to at least a part of the plurality of intent analysis results, based on one of the plurality of guide information being selected, perform a function corresponding to the selected guide information, and based on the performed function being maintained for a predetermined time or more, control the memory to store the mapping information between the performed function and the text information.

18 Claims, 10 Drawing Sheets

(56) References Cited

U.S. PATENT DOCUMENTS

| | | | | |
|---|---|---|---|---|
| 9,426,509 | B2* | 8/2016 | Ellis | H04H 60/72 |
| 9,484,030 | B1* | 11/2016 | Meaney | H04R 3/005 |
| 9,886,953 | B2* | 2/2018 | Lemay | G10L 15/22 |
| 10,629,192 | B1* | 4/2020 | Streat | G10L 15/063 |
| 10,757,207 | B1* | 8/2020 | Kharwandikar | H04L 67/22 |
| 2003/0028871 | A1* | 2/2003 | Wang | H04N 21/454 |
| | | | | 348/E7.054 |
| 2007/0299670 | A1* | 12/2007 | Chang | G07C 9/27 |
| | | | | 704/E15.04 |
| 2011/0032423 | A1* | 2/2011 | Jing | H05B 47/19 |
| | | | | 348/E7.001 |
| 2014/0092007 | A1 | 4/2014 | Kim et al. | |
| 2015/0161984 | A1* | 6/2015 | VanBlon | G10L 15/22 |
| | | | | 704/244 |
| 2015/0279360 | A1* | 10/2015 | Mengibar | G06F 40/30 |
| | | | | 704/257 |
| 2016/0328667 | A1* | 11/2016 | Macciola | G06Q 10/0633 |
| 2017/0068670 | A1* | 3/2017 | Orr | G06F 16/438 |
| 2017/0257470 | A1* | 9/2017 | Youn | G06F 3/167 |
| 2017/0315519 | A1* | 11/2017 | Laurent | G06F 3/011 |
| 2017/0358305 | A1* | 12/2017 | Kudurshian | G10L 13/02 |
| 2018/0190283 | A1* | 7/2018 | Xun | G10L 15/22 |
| 2019/0371342 | A1* | 12/2019 | Tukka | H04M 1/724 |
| 2020/0027446 | A1* | 1/2020 | Ture | G10L 25/54 |
| 2020/0226481 | A1* | 7/2020 | Sim | G06N 20/00 |
| 2020/0286475 | A1* | 9/2020 | Ji | G06N 20/00 |

FOREIGN PATENT DOCUMENTS

| | | |
|---|---|---|
| KR | 10-1511832 | 4/2015 |
| KR | 10-1660269 | 9/2016 |
| KR | 10-2017-0078788 | 7/2017 |
| KR | 10-2018-0038027 | 4/2018 |

* cited by examiner

ELECTRONIC APPARATUS AND CONTROLLING METHOD THEREOF

CROSS-REFERENCE TO RELATED APPLICATION

This application is based on and claims priority under 35 U.S.C. § 119 to Korean patent application number 10-2018-0122968, filed on Oct. 16, 2018, in the Korean Intellectual Property Office, the disclosure of which is incorporated by reference herein in its entirety.

BACKGROUND

1. Field

The disclosure relates to an electronic apparatus and a controlling method thereof. For example, the disclosure relates to an electronic apparatus for guiding an intent analysis result for a user utterance and a controlling method thereof.

2. Description of Related Art

Recently, a voice-based interface means of a user has been widely applied to a device such as a TV, a smartphone, or the like, as a result of development of the voice recognition and intent analysis technology. The utilization range thereof has been also diversified, such as device control, searches, and agent functions, or the like. This is enabled by the deep neural network technology which is applied to a voice recognition and intent analysis system, resulting in dramatic improvement in the performance of the system. While increase in the utilization range of the voice interface enables a user to be provided with various voice use experiences, on the other hand, the possibility of collision occurrence between user utterances input in various forms is also increased, and this may lead to voice recognition and intent analysis errors.

Most audio interface systems are configured to convert input utterance of a user into character strings through voice recognition, analyze an intent of the corresponding character strings, and execute a corresponding function. In such a configuration, the voice recognition error or the intent analysis error finally leads to an error of the audio interface system (or the voice interface system), and as a result, a malfunction of a device may occur.

SUMMARY

Example embodiments of the disclosure provide an electronic apparatus and a controlling method thereof for providing guidance information on an intent analysis result and analyzing a user utterance intent in consideration of the user's use history.

According to an example embodiment, an electronic apparatus includes a memory, and a processor configured to control the electronic apparatus to generate a user interface (UI) including a plurality of guide information corresponding to at least a part of a plurality of intent analysis results based on the plurality of intent analysis results in relation to text information corresponding to a user voice being obtained, perform a function corresponding to selected guide information based on one of the plurality of guide information being selected, and control the memory to store the mapping information between the performed function and the text information based on the performed function being maintained for a predetermined time or more.

The electronic apparatus may generate a UI and transmit the UI to an external device including a display. For example, the electronic apparatus 100 may use a communication interface for transmission to the external device.

In case of the electronic apparatus 100 including the display, the electronic apparatus 100 may display a UI generated by transmitting to a display inside the electronic apparatus 100, not an external device.

The processor may, based on one of the plurality of guide information being selected, be configured to control the electronic apparatus to perform a first function corresponding to selected guide information, and based on a user command corresponding to another one of the plurality of guide information being received within a predetermined time, after the first function is performed, perform a second function corresponding to the another guide information, and control the memory to store the mapping information between the second function and the text information.

The processor may be configured to control the electronic apparatus to, based on one of the plurality of guide information being selected, perform a first function corresponding to the selected guide information, and based on a user command corresponding to a third function that is not included in the plurality of guide information being received within a predetermined time, after the first function is performed, perform the third function, and control the memory to store the mapping information between the third function and the text information.

The processor may be configured to control the electronic apparatus to obtain a reliability value for each of a plurality of intent analysis results obtained in relation to the text information, and generate a UI including a plurality of guide information corresponding to the part, from among the plurality of intent analysis results, based on the size of the obtained reliability value.

The processor may be configured to control the electronic apparatus to, based on a reliability value for any one of the plurality of intent analysis results being greater than or equal to a predetermined threshold, execute a function corresponding to the intent analysis results, and based on a reliability value of each of the plurality of intent analysis results being less than the predetermined threshold, generate a UI including the plurality of guide information.

The processor may be configured to control the electronic apparatus to, based on the text information being identified to be related to device control, obtain a reliability value for each of the plurality of intent analysis results that are obtained in relation the text information.

The processor may be configured to control the electronic apparatus to, based on the text information not being identified to be related to device control, identify whether the text information includes information related to prestored content, and based on the text information not including information related to the content, generate a UI including a plurality of guide information related to a search type based on the text information.

The processor may be configured to control the electronic apparatus to perform a search for the text information based on selected guide information from among the plurality of guide information, obtain a string similarity value of a search result and the text information, and based on the string similarity value being greater than or equal to a predetermined value, control the memory to store the mapping information between the search result and the text information.

The search type may include at least one of a web search, a video on demand (VOD) search, and an electronic program guide (EPG) search.

The processor may be configured to control the electronic apparatus to, based on the text information not being identified to be related to device control, identify whether the text information includes information related to prestored content, and based on the text information including information related to the content, generate a UI including a plurality of guide information related to a type of the content.

The electronic apparatus may further include a display, and the processor may be configured to control the display to display a UI including the plurality of guide information.

According to an example embodiment, a method of controlling an electronic apparatus includes receiving a user voice, generating a user interface (UI) including a plurality of guide information corresponding to at least a part of a plurality of intent analysis result based on the plurality of intent analysis results in relation to text information corresponding to a user voice being obtained, performing a function corresponding to selected guide information based on one of the plurality of guide information being selected, and mapping the performed function with the text information and storing the mapping information based on the performed function being maintained for a predetermined time or more.

The performing a function corresponding to the selected guide information may include, based on one of the plurality of guide information being selected, performing a first function corresponding to selected guide information, and based on a user command corresponding to another one of the plurality of guide information being received within a predetermined time, after the first function is performed, performing a second function corresponding to the another guide information, and mapping the second function with the text information and storing the mapping information.

The method may further include performing a first function corresponding to the selected guide information based on one of the plurality of guide information being selected, and based on a user command corresponding to a third function that is not included in the plurality of guide information being received within a predetermined time, after the first function is performed, performing the third function, and mapping the third function with the text information and storing the mapping information.

The method may further include obtaining a reliability value for each of a plurality of intent analysis results obtained in relation to the text information, and the generating the UI may include generating a UI including a plurality of guide information corresponding to the part, from among the plurality of intent analysis results, based on the size of the obtained reliability value.

The generating the UI may include, based on a reliability value for any one of the plurality of intent analysis results being greater than or equal to a predetermined threshold, executing a function corresponding to the intent analysis results, and based on a reliability value of each of the plurality of intent analysis results being less than the predetermined threshold, generating a UI including the plurality of guide information.

The obtaining a reliability value may include, based on the text information being identified to be related to device control, obtaining a reliability value for each of the plurality of intent analysis results that are obtained in relation the text information.

The method may further include, based on the text information not being identified to be related to device control, identifying whether the text information includes information related to prestored content.

The generating the UI may include, based on the text information not including information related to the content, generating a UI including a plurality of guide information related to a search type based on the text information.

The method may further include performing a search for the text information based on selected guide information from among the plurality of guide information; and obtaining a string similarity value of a search result and the text information.

The mapping the performed function with the text information and storing the mapping information may include, based on the storing the similarity value being greater than or equal to a predetermined value, mapping the search result with the text information and storing the mapping information.

According to an example embodiment, a non-transitory computer readable medium having stored thereon computer instructions which, when executed by a processor of an electronic apparatus, controls the electronic apparatus to perform operations including receiving a user voice, generating a user interface (UI) including a plurality of guide information corresponding to at least a part of a plurality of intent analysis results based on the plurality of intent analysis results in relation to text information corresponding to a user voice being obtained, performing a function corresponding to selected guide information based on one of the plurality of guide information being selected, and mapping the performed function with the text information and storing the mapping information based on the performed function being maintained for a predetermined time or more.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
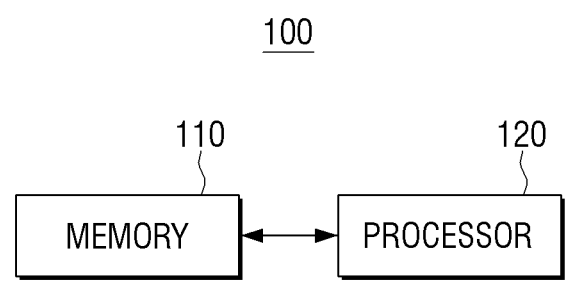
FIG. 1 is a block diagram illustrating an example electronic apparatus according to an embodiment.

Before describing various example embodiments of the disclosure in greater detail, a manner of understanding the present disclosure and drawings will be described.

The terms used in the present disclosure and the claims are general terms identified in consideration of the functions of the various example embodiments of the disclosure. However, these terms may vary depending on intention, legal or technical interpretation, emergence of new technologies, and the like of those skilled in the related art. Also, some terms may be arbitrarily selected. Unless there is a specific definition of a term, the term may be understood based on the overall contents and technological common sense of those skilled in the related art.

Further, like reference numerals indicate like components that may perform substantially the same functions throughout the disclosure. For convenience of descriptions and understanding, the same reference numerals or symbols may be used and described in different example embodiments. In other words, although elements having the same reference numerals are all illustrated in a plurality of drawings, the plurality of drawings are not limited to one embodiment.

The terms such as "first," "second," and so on may be used to describe a variety of elements, but the elements should not be limited by these terms. The terms are used simply for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

Further, various modifications may be made to the embodiments of the disclosure, and there may be various types of embodiments. Accordingly, specific example embodiments may be illustrated in drawings, and the embodiments will be described in greater detail in the detailed description. However, it should be noted that the various embodiments are provided for illustration and do not for limit the scope of the disclosure to any specific embodiment, and they should be interpreted to include all modifications, equivalents or alternatives of the embodiments included in the ideas and the technical scope disclosed herein. Meanwhile, in case it is determined that in describing embodiments, detailed description of related known technologies may unnecessarily confuse the gist of the disclosure, the detailed description may be omitted.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, that another element may be additionally included, rather than precluding another element.

FIG. 1 is a block diagram illustrating an example electronic apparatus according to an embodiment.

Referring to FIG. 1, an electronic apparatus 100 may include a memory 110 and a processor (e.g., including processing circuitry) 120.

The electronic apparatus 100 may, for example, and without limitation, be a TV, a desktop PC, a notebook, a smartphone, a tablet PC, a server, or the like. The electronic apparatus 100 may be implemented as a system in which a cloud computer environment is established, such as, for example, a cloud server.

The memory 110 may store various information applied to a user utterance intent analysis system (model).

For example, the memory 110 may be implemented as, for example, and without limitation, at least one of a non-volatile memory, volatile memory, a flash memory type, solid state drive (SSD), read-only memory (ROM), random-access memory (RAM), a hard disk type, a multimedia card micro type, a card type memory (for example, secure digital (SD) memory or an extreme digital (xD) memory), or the like.

The memory 110 may be implemented not only as a storing medium inside the electronic apparatus but also as an external storing medium, for example, a micro SD card, a USB memory, or web server through network, or the like.

For example, the memory 110 may store mapping information of a function (operation) selected by a user and corresponding text information. The mapping information stored in the memory 110 may be used to update a user utterance intent analysis system (module).

In addition, the memory 110 may store keywords related to recent contents. If the keyword associated with the latest content stored in the memory 110 is included in the intent analysis result, the electronic apparatus 100 may determine that the user utterance corresponds to an utterance for searching (hereinafter, "search utterance").

The processor 120 may include various processing circuitry and perform overall control operations of the electronic apparatus 100. For example, the processor 120 may perform a function to control overall operations of the electronic apparatus 100.

The processor 120 may include various processing circuitry, such as, for example, and without limitation, a digital signal processor (DSP), a microprocessor, a time controller (TCON), or the like, for processing a digital image signal, but is not limited thereto. The processor 120 may include various processing circuitry, such as, for example, and without limitation, one or more among a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 120 may be implemented in a system on chip (SoC) type or a large scale integration (LSI) type which a processing algorithm is built therein or in a field programmable gate array (FPGA) type.

The processor 120 may obtain a plurality of intention analysis results in relation to text information corresponding to the user voice. The operation of obtaining the text information corresponding to the user voice may correspond to a voice recognition operation. In addition, the operation of outputting a result value corresponding to the text information may correspond to a voice recognition operation. In the disclosure, a result value of a voice recognition operation may refer, for example, to an intent analysis result. For example, a result which is obtained in relation to the text information may be named the intent analysis result, separate from the operation to obtain the text information corresponding to the user voice. In other words, the intent analysis result may correspond to a result of performing a voice recognition operation.

The electronic apparatus 100 may receive user voice data from an external electronic apparatus including a microphone. The microphone of the external electronic apparatus may convert a user voice into digital audio data, and the external electronic apparatus may transmit the converted voice data to the electronic apparatus 100. For example, the external electronic apparatus may be a remote controller including a microphone. However, in some cases, the electronic apparatus 100 may include a microphone and receive a user voice through the microphone.

The processor 120 may obtain a plurality of intention analysis results in association with text information corresponding to a user voice. For example, the text information may be text obtained by converting speech of a user through Speech to Text (STT) conversion. For example, when the user utters "Execute number 11", text information "Execute number 11" may be generated.

In this example, the voice recognition for the user voice may be performed by the processor 120, or may be performed by an external device (for example, an external server). For example, the processor 120 may obtain text information by performing voice recognition on a user voice, and obtain a plurality of intention analysis results related to the obtained text information. As another example, the processor 120 may transmit user voice to an external server, and receive a plurality of intention analysis results related to the text information from an external server. As still another example, the processor 120 may transmit user voice to an external server, receive text information corresponding to the user voice from an external server, and obtain a plurality of intention analysis results related to the received text information.

In the disclosure, the voice recognition operation may refer, for example, to a situation in which a plurality of corresponding intention analysis results is obtained using an operation of converting the received voice data to text information and the converted text information.

However, the operation of converting received voice data into text information and the operation of obtaining a plurality of corresponding intent analysis results using the converted text information may be performed, for example, and without limitation, through a separate device, a separate algorithm, or the like.

In the disclosure, a voice recognition operation and an intent analysis operation are described separately for convenience of description. For example, an operation of converting a user utterance into text information may be described as a voice recognition operation. In addition, an operation of outputting a plurality of intent analysis results using the text information may be described as an intent analysis operation. However, it will be understood that the disclosure is not limited thereto.

In some cases, an operation of converting the user utterance to text information and an operation of outputting a plurality of intent analysis results using the text information may be described as a voice recognition operation. The voice recognition operation may refer, for example, to all operations of an electronic apparatus 100 (or an external server) performed by recognizing the user voice.

All of the operations of converting the user utterance into text information and outputting a plurality of intention analysis results using the text information may be described as one intent analysis operation. A plurality of intent analysis results related to the text information may be at least one of a control operation and information that may be provided, based on the text information.

For example, when the text information obtained by performing the voice recognition operation through the processor 120 is "Execute number 11", the plurality of intention analysis results is "Execute channel number 11", "Execute channel number 111," "Execute soap opera number 11", "Execute application number 11," "Execute game number 11." For example, if the user's utterance intent is not clearly identified based on the text information, various examples which may have a possibility as the intent of the user utterance may be obtained as the intent analysis result.

The processor 120 may generate a UI including a plurality of guide information corresponding to at least a part of the plurality of intent analysis results. The plurality of guide information may, for example, include the plurality of intent analysis results themselves, or information which partly transforms the plurality of the intent analysis results.

For example, if the text information obtained by the electronic apparatus 100 is an "Execute channel number 11," the guide information may be "Execute channel number 11" or "Show channel number 11." Since a user may determine that the meaning of executing seems unclear, the electronic apparatus 100 may provide a user with guide information including a clear meaning of watching the channel 11. For example, the processor 120 may obtain the guide information ("Show channel number 11", "Show channel number 111", "Execute soap opera named number 11", "Execute an application named number 11", "Execute a game named number 11") corresponding to the plurality of intent analysis results ("Execute channel number 11", "Execute channel number 111", "Execute soap opera number 11", "Execute application number 11", "Execute game number 11").

The processor 120 may provide a user with an UI including the guide information corresponding to the intent analysis result, finally.

When one of a plurality of guide information is selected by a user, the processor 120 may perform a function corresponding to the selected guide information. For example, when a user selects the guide information corresponding to "Show channel number 11", the processor 120 may perform a channel change to channel number 11. In addition, the processor 120 may generate a control command to move to channel number 11.

If the performed function is maintained for a predetermined time or more, the processor 120 may map the performed function with the text information. In addition, the processor 120 may store the mapping information in the memory 110. For example, in the above-described embodiment of "Execute number 11", when a user selects an item corresponding to "Show channel number 11" from among a plurality of guides information, the processor 120 may map the text information ("Execute number 11") and guide information ("Show channel number 11").

The processor 120 may map the text information with guide information and store the mapping information in the memory 110. Thereafter, when the user utters "Execute number 11" again, an operation corresponding to "Show channel number 11" may be directly executed, without the above process.

It has been described that the text information and the guide information are mapped, but in actual implementation, the control command corresponding to the guide information may be mapped. For example, the text information ("Execute number 11") and the control command ("Move to channel number 11") corresponding to the guide information may be mapped.

When one of the plurality of guide information is selected, the processor 120 may perform a first function corresponding to the selected guide information, and when a user command corresponding to another one of the plurality of guide information is received within a preset time after the first function is performed, may perform a second function corresponding to the other guide information, and control the memory 101 to map the second function with the text information and store the mapping information.

It may be assumed that the user has selected incorrect guide information among the plurality of guide information. For example, it is assumed that "Show channel number 111" is selected from among a plurality of guide information ("Show channel number 11", "Show channel number 111", "Execute soap opera named number 11", "Execute application named number 11", "Execute the game named number 11"), unlike the user's intent. Here, the processor 120 may execute a control command to move to channel number 111.

Accordingly, the user may input a subsequent command in accordance with an incorrect selection. For example, if a user command (Move to channel number 11) corresponding to another one of a plurality of guide information is input within a predetermined time, the processor 120 may execute a control command to move to channel 11. For example, immediately after the processor 120 executes the control command for the user's selection ("Show channel number 111", first function), the processor 120 may execute a control command (Channel number 11 change, second function). In this example, the processor 120 may map the "Show channel number 11" corresponding to the second function and text information ("Execute number 11").

When one of the plurality of guide information is selected, the processor 120 may perform a first function corresponding to the selected guide information, when the first function is performed and a user command corresponding to a third function which is not included in the plurality of guide information is received within a predetermined period of time, perform the third function, and control the memory 101 to map the third function with the text information and store the mapping information.

In the above-described example in which it is assumed that "Show channel number 111" is selected unlike the user's intent, a control command to execute a function that is not included in the plurality of guide information ("Show channel number 11", "Show channel number 111", "Execute soap opera named number 11", "Execute application named number 11", "Execute the game named number 11") may be input. For example, the user may input a control command to play back a movie named number 11.

Immediately after the processor 120 executes a control command for the user's selection ("Show channel number 111", first function), if a subsequent command (Execution of a movie content named number 11, a third function) of the user is input, the processor 120 may perform a function corresponding to the command. The processor 120 may map "Execution of a movie content named number 11" corresponding to the third function and the text information ("Execute number 11").

The processor 120 may obtain a reliability value for each of a plurality of intent analysis results obtained in relation to the text information. The processor 120 may generate a UI including a plurality of guide information corresponding to a part of a plurality of intent analysis results based on the size of the obtained reliability value.

If the reliability value of any one of the plurality of intent analysis results is equal to or greater than a predetermined threshold value, the processor 120 may execute a function corresponding to the result of the intent analysis, and if the reliability value of each of the plurality of intent analysis results is less than the predetermined threshold value, a UI including a plurality of guide information may be generated. For example, the reliability value may be calculated by applying an artificial intelligence (AI) model. The user may calculate the degree of reliability of the corresponding input value by applying the AI model using the intent analysis result (or text information) as the input value. The processor 120 may use the AI model that is learned in accordance with at least one of machine learning, neural network or deep learning algorithms.

An artificial intelligence (AI) system may refer, for example, to a computer system implementing a human level of intelligence, which is self-learning, determines, and improves recognition rate as the machine is used.

The AI technology uses an algorithm which sorts/learns characteristics of input data by itself (deep learning) a technology and a machine learning algorithm are utilized to simulate a function of recognizing, determining, and the like of a human brain.

The elementary techniques include, for example, a language understanding technique for recognizing a human language/character, a visual understanding technique for recognizing an object as a human vision, a reasoning/prediction technique for reasoning and predicting information to predict and logically predict information, a knowledge representation technique for processing experiential information of the robot as knowledge data, and an operation control technique for controlling autonomous travel of the vehicle and movement of a robot.

Linguistic understanding may refer, for example, to a technology for recognizing, applying/processing human language/characters and includes natural language processing, machine translation, dialogue system, question & answer, speech recognition/synthesis, and the like.

The processor 120 may identify whether the user utterance corresponds to an utterance for device control (hereinafter, "device control utterance") by applying the AI model described above. For example, the processor 120 may obtain reliability that is an output value of the AI model. The processor 120 may then determine, based on the obtained reliability, whether the user's voice is related to the device control utterance.

When it is identified that the intention analysis result (or text information) is related to the device control, the processor 120 may obtain a reliability value for each of the plurality of intent analysis results obtained with respect to the text information.

When it is not identified that the text information is related to the device control, the processor 120 may identify that the prestored contents-related information is included in the text information.

When the information related to the contents is not included in the text information, a UI including a plurality of guide information related to a search type may be generated based on the text information. For example, the search type may include at least one of a video on demand (VOD) and an electronic program guide (EPG).

The processor 120 may perform a search on the text information based on the selected guide information among the plurality of guide information, and obtain a string similarity value of the search result and the text information. If the string similarity value is greater than or equal to the predetermined value, the processor 120 may control to map the search result and the text information in the memory 101 and store the mapping information.

If it is not identified that the text information is related to the device control, the processor 120 may identify whether the text information includes prestored information related to the contents, and if information related to the contents is included in the text information, the processor 120 may generate a UI including a plurality of guide information related to the type of the contents.

The electronic apparatus may further include a display, and the processor 120 may control the display to display a UI including a plurality of guide information.

In the description above, it has been described that an operation of the disclosure is performed by a processor of the electronic apparatus 100. However, the electronic apparatus 100 according to still another embodiment may perform a part of operation from among entire operations, and remaining operations may be performed by an external server.

The electronic apparatus 100 according to still another embodiment may, for example, only receive or output related information, but the actual operation may be performed by an external server. For example, the electronic apparatus 100 may transmit voice data corresponding to a user utterance to an external server, and perform a voice recognition operation in an external server. The external server may transmit the intent analysis result to the electronic apparatus 100.

After the voice recognition operation and the user utterance intent analysis are performed in the external server, a result may be provided to the electronic apparatus 100.

The electronic apparatus 100 according to an embodiment may transmit a digital audio signal received by a voice (or audio) recognition external server. The voice recognition external server may perform a speech to text (STT) function for converting a digital audio signal into text information. The voice recognition external server may perform the STT function to convert the digital audio signal into text information and search information corresponding to the converted text information. The voice recognition external server may transmit the information corresponding to the converted text information to the electronic apparatus 100. The above-described voice recognition external server may simultaneously perform the STT function and the search function.

The STT function may be performed in the voice recognition external server and a search function may be performed in a separate external server. In this example, in the external server performing the STT function, a digital audio signal may be converted to the text information, and the converted text information may be transmitted to a separate external server for performing a search function.

The electronic apparatus 100 according to another embodiment may directly perform the STT function. The electronic apparatus 100 may convert the digital audio signal to text information and transmit the converted text information to a voice recognition external server. In this example, the voice recognition external server may perform only the search function. The voice recognition external server may search information corresponding to the converted text information and transmit the information to the electronic apparatus 100.

In the description of the electronic apparatus 100 according to an embodiment, it is assumed that a plurality of intent analysis results is received. However, even when one intent analysis result is received in actual implementation, the operations disclosed in this disclosure may be applied. For example, if there is a user utterance of "Execute number 11", only the intent analysis result of "Execute channel number 11" may be performed. The processor 120 may provide a user with the guide information to identify whether the intent analysis result of "Execute channel number 11" matches the intent of the user. The case where only one of the above-described intent analysis results is obtained may be applied to the various embodiments described in this disclosure.

The electronic apparatus 100 according to an embodiment may improve an error which may occur due to input of an utterance which is in a format that is not reflected to the intent analysis model learning. By automatically updating the intent analysis model based on the user response to the user utterance having an error in the intent analysis, that is, use history, and improving the performance, the user convenience of the voice interface may be improved and the intent analysis error may be minimized and/or reduced as a result.

The intent analysis system based on the probability model using a deep neural network may connect the intent corresponding to each of the strings which the user may utter, and learn the intent analysis model. The analysis error in the probability model-based system may occur when the sentence structure of utterance is not reflected to learning, a keyword such as a new named entity is not reflected to learning, or utterance of which intent is different but sentence structure is similar is input, or the like. In order to minimize and/or reduce such intent analysis error, it is possible to collect and reflect the various types of utterance that may be input by the user as much as possible, and reflect the utterance to the learning. However, in a situation where there are a number of users, and each of the individual's utterance habit is different, collecting the various types of utterances that may be input for all functions and reflecting to the learning require a lot of time and money. For this reason, it is possible to periodically reflect the new sentence structure, new named entity, or the like, which may be extracted by analyzing the utterance of an actual user, along with the basically collected learning utterance. However, a situation may be maintained in which a series of procedures such as the actual user utterance collection process, the new sentence structure and named entity extraction process, and the re-learning process, or the like, are proceeded manually, and the same error inevitably continues until the completion timing. According to various example embodiments of the disclosure, it is possible to proceed with the automatic renewal of the system internally through the user's use behavior analysis for the case where the intent analysis results show that reliability is low or the analysis is not possible.

Figure 2A:
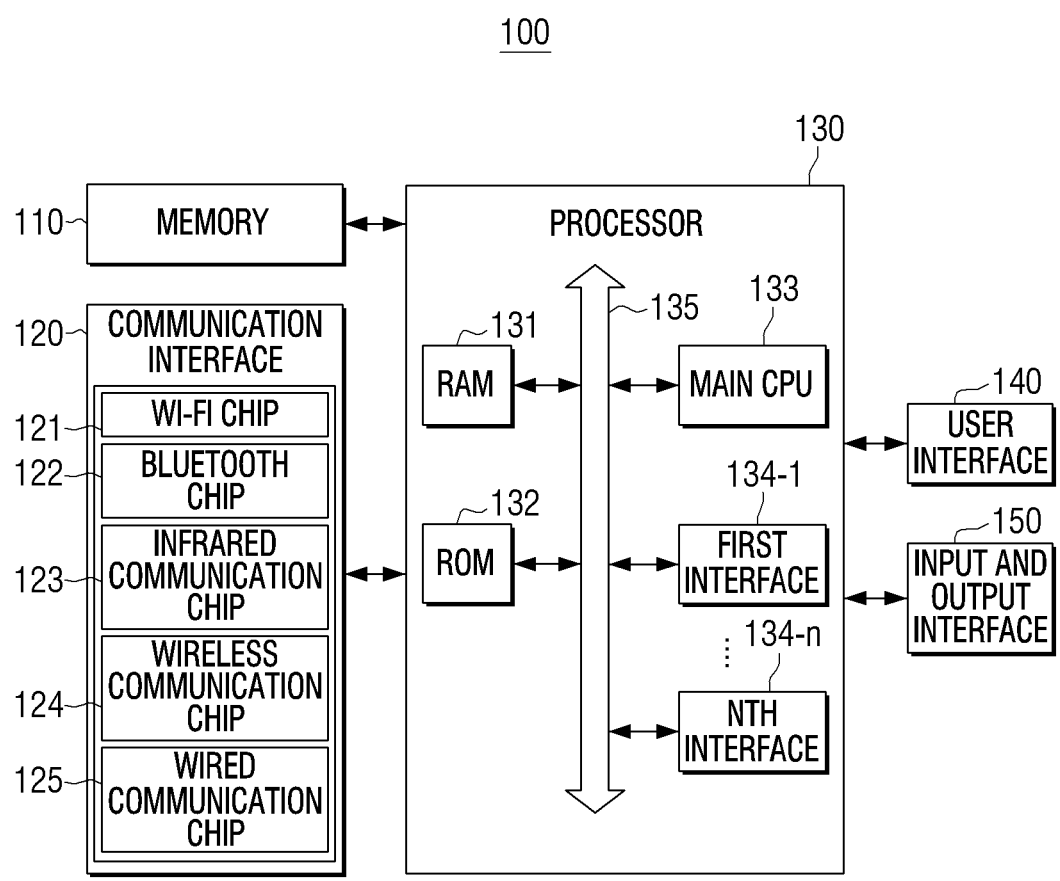
FIGS. 2A and 2B are block diagrams illustrating example configurations of the electronic apparatus of FIG. 1.

FIG. 2A is a block diagram illustrating an example configuration of the electronic apparatus of FIG. 1.

The electronic apparatus 100 may, for example, and without limitation, be a TV, a desktop PC, a notebook, a smartphone, a tablet PC, a server, or the like. The electronic apparatus 100 may be implemented as a system itself in which a cloud computing environment is established, for example, a cloud server.

The memory 110 may be implemented as an internal memory such as a read-only memory (ROM) (for example, electrically erasable programmable read-only memory (EEPROM)) and a random-access memory (RAM) or a memory separate from the processor 130.

The memory 110 may be implemented as a memory embedded in the electronic apparatus 100 for a data storage use, or a memory type detachable from the electronic apparatus 100. For example, the data for driving the electronic apparatus 100 may be stored in a memory embedded in the electronic apparatus 100, and the data for an expansion of the electronic apparatus 100 may be stored in a memory detachable from the electronic apparatus 100.

A memory embedded in the image processing apparatus 100 may be implemented, for example, and without limitation, as at least one of a volatile memory such as a dynamic random access memory (DRAM), a static random access memory (SRAM), a synchronous dynamic random access memory (SDRAM), a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD), a solid state drive (SSD), or the like). In the case of a memory detachably mounted to the electronic apparatus 100, the memory may be implemented, for example, and without limitation, as a memory card (for example, a compact flash (CF), secure digital (SD), micro secure digital (micro-SD), mini secure digital (mini-SD), extreme digital (xD), multimedia card (MMC), etc.), an external memory (for example, a universal serial bus (USB) memory) connectable to the USB port, or the like.

The communication interface 120 may include various chips including various communication circuitry and may communicate with various types of external devices according to various types of communication methods. The communication interface 120 may include various chips including various communication circuitry, such as, for example, and without limitation, a Wi-Fi chip 121, a Bluetooth chip 122, an infrared communication chip 123, a wireless communication chip 124, a wired communication chip 125, or the like. The processor 130 may communicate with various external devices using the communication interface 120.

The communication interface 120 may communicate with other external devices or the external server. The external device may be an electronic apparatus capable of outputting image contents. For example, when the external device is a TV, the type of the external device is an image device, and output data information of the TV may include a model name of a TV, audio characteristics of the output contents of the TV, frequency characteristics of the output audio from among the TV output contents, or the like, but are not limited thereto. In addition, the external device communicating with the communication interface 120 may include a remote controller, a Bluetooth speaker, a lighting device, a smart cleaner, a smart refrigerator, an IoT home manager, or the like, in addition to a device capable of outputting image contents. For example, the communication interface 120 may transmit video/audio data or various control data to the external device or the external server.

The Wi-Fi chip 121 and the Bluetooth chip 122 perform communication using Wi-Fi method and Bluetooth method, respectively. When using the Wi-Fi chip 121 or the Bluetooth chip 122, various connection information such as a service set identifier (SSID) and a session key may be transmitted and received first, and communication information may be transmitted after communication connection.

The Wi-Fi chip 121 and the Bluetooth chip 122 may include various communication circuitry and perform communication by the Wi-Fi method and Bluetooth method, respectively. When using the Wi-Fi chip 121 or the Bluetooth chip 122, the various connection information such as the SSID and the session key may be transceived first, and various information may be transceived after communication connection.

The infrared communication chip 123 may include various communication circuitry and performs communication according to infrared data association (IrDA) technology that transmits data wireless to local area using infrared ray between visible rays and millimeter waves.

The wireless communication chip 124 may include various communication circuitry in a chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the Wi-Fi chip 121 and the Bluetooth chip 122 described above.

The wired communication chip 125 may include various communication circuitry and may be connected to an external device by wire and performs communication. For example, the wired communication chip 125 may include at least one of a universal serial bus (USB), a high definition multimedia interface (HDMI), a recommended standard 232 (RS-232), a plain old telephone service (POTS), or the like. In addition, for the wired communication technology, a pair cable, a coaxial cable, an optical fiber cable, Ethernet cable, a power line communication (PLC), or the like, may be used.

The electronic apparatus 100 may additionally include a tuner and a demodulator according to examples.

The tuner (not shown) may receive a radio frequency (RF) broadcasting signal by tuning a channel selected by a user or all the prestored channels, fro, among RF broadcasting signals that are received through the antenna.

A demodulator (not shown) may receive and demodulate a digital intermediate frequency (DIF) signal that is converted by the tuner, and perform channel decoding, or the like.

According to an embodiment, the communication interface 120 may use the Wi-Fi module (or chip) to communicate with an external device such as a remote controller and an external server. When the communication interface 120 is implemented as a plurality of communication units, the communication interface 120 may use a communication unit which includes at least one of an Ethernet modem or Wi-Fi modem for communicating with an external server, and use a communication unit including a Bluetooth (BT) module to communicate with an external device such as a remote controller. This is merely exemplary and is not limited thereto.

The processor 130 may include various processing circuitry and controls overall operations of the electronic apparatus 100 using various programs stored in the memory 110.

For example, the processor 130 may include the RAM 131, the ROM 132, a main CPU 133, a first to $n^{th}$ interfaces 134-1~134-n, and a bus 135.

The RAM 131, ROM 132, main CPU 133, the first to $n^{th}$ interfaces 134-1~134-n, or the like, may be interconnected through the bus 135.

The ROM 132 may store a command set for booting the system and the like.

When the turn-on command is input and power is supplied, the CPU 133 copies the OS stored in the memory 110 to the RAM 131 according to a command stored in the ROM 132, and executes the OS to boot the system. When the booting is completed, the CPU 133 copies various application programs stored in the memory 110 to the RAM 131, executes the application program copied to the RAM 131, and performs various operations.

The main CPU 133 accesses the memory 110 and performs booting using an operating system (OS) stored in the memory 110, and performs various operations using various programs, contents data, or the like, stored in the memory 110.

The first to $n^{th}$ interface 134-1 to 134-$n$ are connected to the various elements described above. One of the interfaces may be a network interface connected to an external device through the network The processor 130 may perform a graphic processing function (video processing function). For example, the processor 130 may generate a screen including various objects such as icons, images, text, and the like. For example, a calculator (not shown) may calculate an attribute value such as a coordinate value, a shape, a size, and a color to be displayed by each object according to the layout of the screen based on the received control command A renderer (not shown) may generate display screens of various layouts including objects based on the attribute value calculated by the calculator (not shown). The processor 130 may perform various image processing such as decoding, scaling, noise filtering, frame rate conversion, resolution conversion, or the like, for the video data.

The processor 130 may perform processing of audio data. For example, the processor 130 may perform various image processing such as decoding, amplifying, noise filtering, and the like, on the audio data.

The user interface 140 may be implemented, for example, and without limitation, as a button, a touch pad, a mouse, a keyboard, a touch screen which may perform the display function and a manipulation input function as well, or the like. For example, the button may be various types of buttons such as, for example, and without limitation, a mechanical button, a touch pad, a wheel, or the like formed on an arbitrary region such as a front portion, a side portion, a back portion, or the like, of an outer part of the main body of the electronic apparatus 100.

The input and output interface 150 may include various input and output circuitry and include, for example, and without limitation, one or more of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The HDMI is an interface capable of transmitting high performance data for an AV device which inputs and outputs audio and video signals. The DP is the interface which may implement an image of a full HD but also an ultra-high resolution screen such as 2560×1600 or 3840×2160, and a 3D stereoscopic image, and transmit a digital sound. The Thunderbolt is an input/output interface for high-speed data transmission and connection, and may connect a PC, a display, a storage device, and the like, with one port in parallel.

The input and output interface 150 may input and output at least one of an audio signal and a video signal.

According to an example, the input and output interface 150 may include a port to input and output only an audio signal or a port to input and output only a video signal as a separate port, or may be implemented as a port which input and output both the audio signal and the video signal.

The electronic apparatus 100 may be implemented as a device not including a display and transmit an image signal to a separate display device.

Figure 2B:
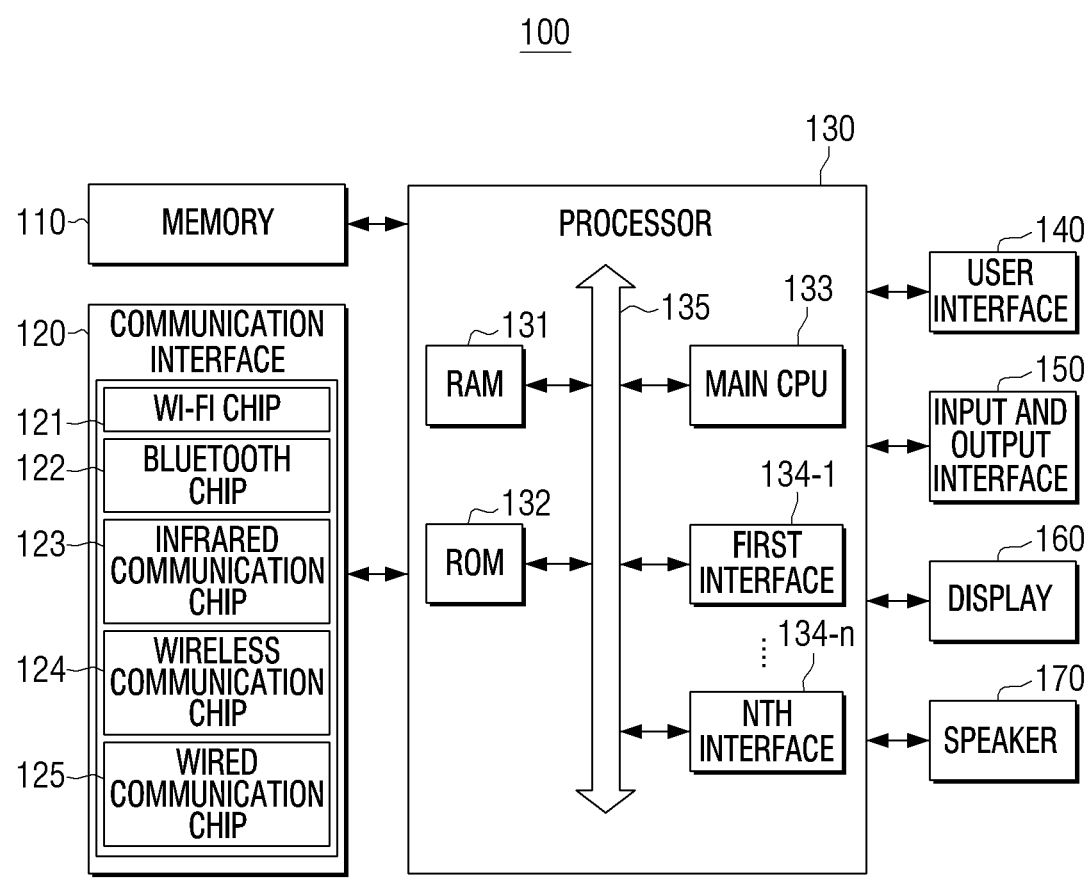

The electronic apparatus 100 may not include a microphone (FIG. 2A) or include a microphone (FIG. 2B).

The electronic apparatus 100 may receive a user voice signal from an external device including a microphone. In this example, the analog user voice received via the microphone provided in the external device may be converted into a digital signal and may be received by the electronic apparatus 100 in the form of a digital signal. For example, the electronic apparatus 100 may receive a digital audio signal from an external device including a microphone through a wireless communication method such as Bluetooth, Wi-Fi, or infrared ray. For example, the external device may be implemented as a remote controller or a smart phone. When the external device is implemented as a smart phone, an application for performing a remote control function may be installed in an external device to control the electronic apparatus 100 or perform a voice recognition operation. The external device may receive the user's voice through the installed application, and may transmit the received user's voice to the electronic apparatus 100.

The electronic apparatus 100 may transmit the audio (or voice) signal to the external server in order to recognize audio (or voice) signal received from the external device.

In this example, a communication module include various communication circuitry for communicating with the external device and the external server may be implemented as one. For example, a communication module for communicating with the external device and the external server may be the same as the Wi-Fi module.

A communication module for communicating with the external device and the external server may be implemented separately. For example, communication with the external device may be performed through a Bluetooth module, and communication with the external server may be performed through the Ethernet modem or the Wi-Fi module.

The electronic apparatus 100 according to an embodiment may transmit a received digital audio signal to a voice recognition server. In this example, the speech recognition server may convert the digital audio signal into text information using the STT. In this case, the speech recognition server may transmit text information to another server or an electronic apparatus to perform a search corresponding to the text information, and in some cases, perform a direct search.

The electronic apparatus 100 according to another embodiment may convert the user voice signal to text information by directly applying the STT function to the digital sound signal, and transmit the converted text information to the external server.

The electronic apparatus 100 may perform a specific function using text information for the user voice signal received from the speech recognition server or text information converted by the electronic apparatus 100. For example, the electronic apparatus 100 may perform a specific function using the processor 130.

According to an example, the electronic apparatus 100 may transmit the converted text information to the external server, and perform search corresponding to the text information received from the external server. When the electronic apparatus 100 receives a search result performed by the external sever, the electronic apparatus 100 may perform a specific function using the received search result.

In FIG. 2B, a display 160 and a speaker 170 may be further included, in addition to the configurations of FIG. 2A.

The display 160 may be implemented as various types of a display such as, for example, and without limitation, a liquid crystal display (LCD), an organic light emitting diode (OLED) display, a plasma display panel (PDP), or the like. In the display 160, a driving circuit and a backlight unit, which may be implemented in the form of an a-si TFT, a low temperature poly silicon (LTPS) TFT, an organic TFT (OTFT) may be included as well. The display 160 may be implemented as a touch screen coupled with a touch sensor, a flexible display, a third-dimensional display (3D display), or the like.

The display 160 according to an embodiment may include not only a display panel for outputting an image but also a bezel for housing a display panel. In particular, the bezel according to an embodiment may include a touch sensor (not shown) to sense a user interaction.

The speaker 170 may include various circuitry and hardware to output various audio data, various alarm sounds, a voice message, or the like, which are processed by the input and output interface 150.

The electronic apparatus 100 may further include a microphone (not shown). The microphone is an element to receive a user voice or other sound and convert to audio data. In this case, the microphone may convert the received analog user voice signal to a digital signal and transmit to the electronic apparatus 100.

The microphone may receive the user voice in an active state. For example, the microphone may be integrally formed as an integral unit on an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

Figure 3:
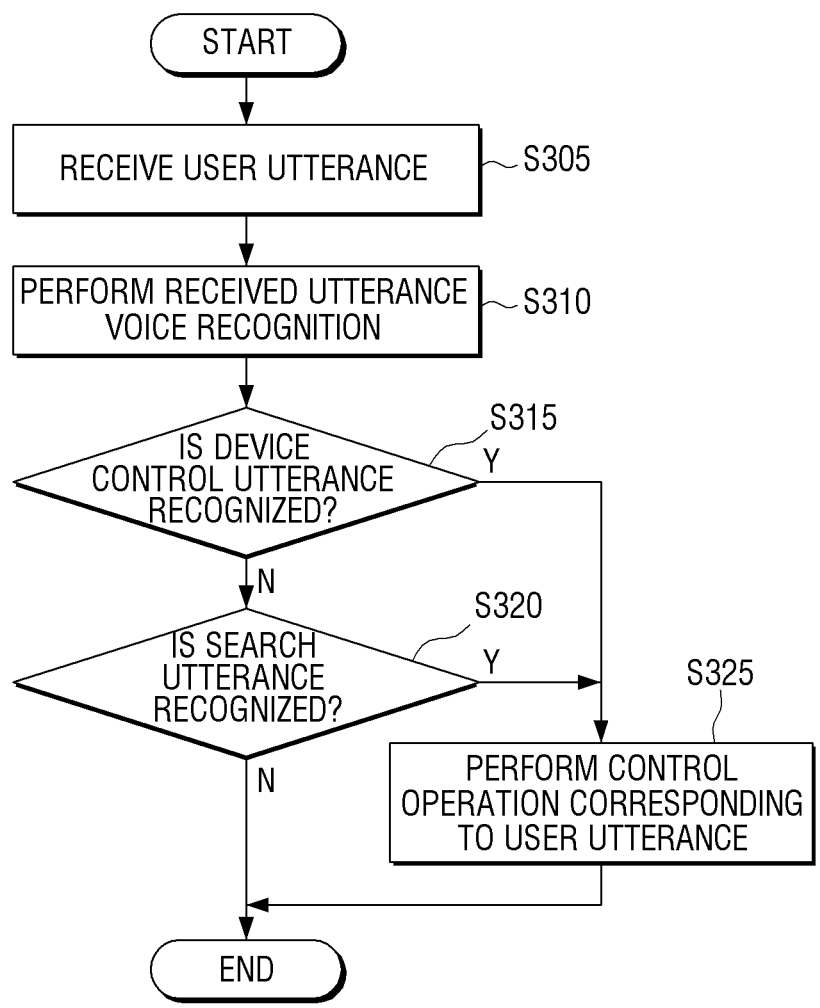
FIG. 3 is a flowchart illustrating an example of analyzing a voice recognition function and a user utterance according to an embodiment.

FIG. 3 is a flowchart illustrating an example of analyzing a voice recognition function and a user utterance according to an embodiment.

Referring to FIG. 3, the electronic apparatus 100 may receive a user utterance. The electronic apparatus 100 may receive digital data for a user voice from an external electronic apparatus (external remote controller) in step S305.

In addition, the electronic apparatus 100 may perform a voice recognition operation based on the received voice data in step S310. For example, the voice recognition operation may refer to an operation of converting voice data corresponding to a user utterance into text information. When the electronic apparatus 100 performs a voice recognition operation, the electronic apparatus 100 may obtain a plurality of intent analysis results.

The electronic apparatus 100 may perform device control or search operations by analyzing the user's uttered voice.

The electronic apparatus 100 may compare whether a pre-stored keyword is included in the obtained intent analysis result to identify whether the utterance is device control in step S315. For example, when a "channel", a "volume", "power" are included in the obtained intent analysis result, the electronic apparatus 100 may identify the user utterance (intent analysis result) as the device control utterance. The electronic apparatus 100 may perform a control operation corresponding to the user utterance, if it is determined that the obtained intent analysis result corresponds to a device control utterance ("Yes" in operation S315) in step S325.

If the electronic apparatus 100 determines that the obtained intent analysis result does not correspond to the device control utterance ("No" in operation S315), the electronic apparatus 100 may determine whether the obtained intent analysis result corresponds to the search utterance in step S320. The electronic apparatus 100 may compare whether the pre-stored keyword is included in the obtained intent analysis result to determine whether the intent analysis result corresponds to the search speech. For example, if the obtained intent analysis result includes words related to the search such as "search," "please search", "search for," or the like, then the electronic apparatus 100 may determine as the search utterance.

The electronic apparatus 100 may prestore a keyword related to recent contents in the memory 110. When a keyword related to the recent contents is included in the intent analysis result, the electronic apparatus 100 may determine that the user utterance corresponds to the search utterance.

When the electronic apparatus 100 identifies that the intent analysis result corresponds to the search utterance ("Yes" in operation S320), the electronic apparatus 100 may perform a control operation corresponding to the user utterance. When the electronic apparatus 100 identifies that the intent analysis result does not correspond to the search utterance ("No" in operation S320), the electronic apparatus 100 may not perform any operation. If the electronic apparatus 100 identifies that the intent analysis result does not correspond to both the device control utterance and the search utterance, the electronic apparatus 100 may not perform the control operation corresponding to the user utterance, and generate a UI to utter a user voice once again.

After performing the speech recognition operation, the electronic apparatus 100 according to an embodiment may first identify whether the user's utterance corresponds to the device control utterance. The electronic apparatus 100 may perform the device control operation most quickly, since the electronic apparatus 100 first identifies whether the obtained intent analysis result corresponds to the device control utterance. The electronic apparatus 100 may preferentially and quickly process the device control operation by comparing the intent analysis result with some pre-stored words associated with the device control utterance, without comparing whether the intent analysis result corresponds to a large number of keywords.

Figure 4:
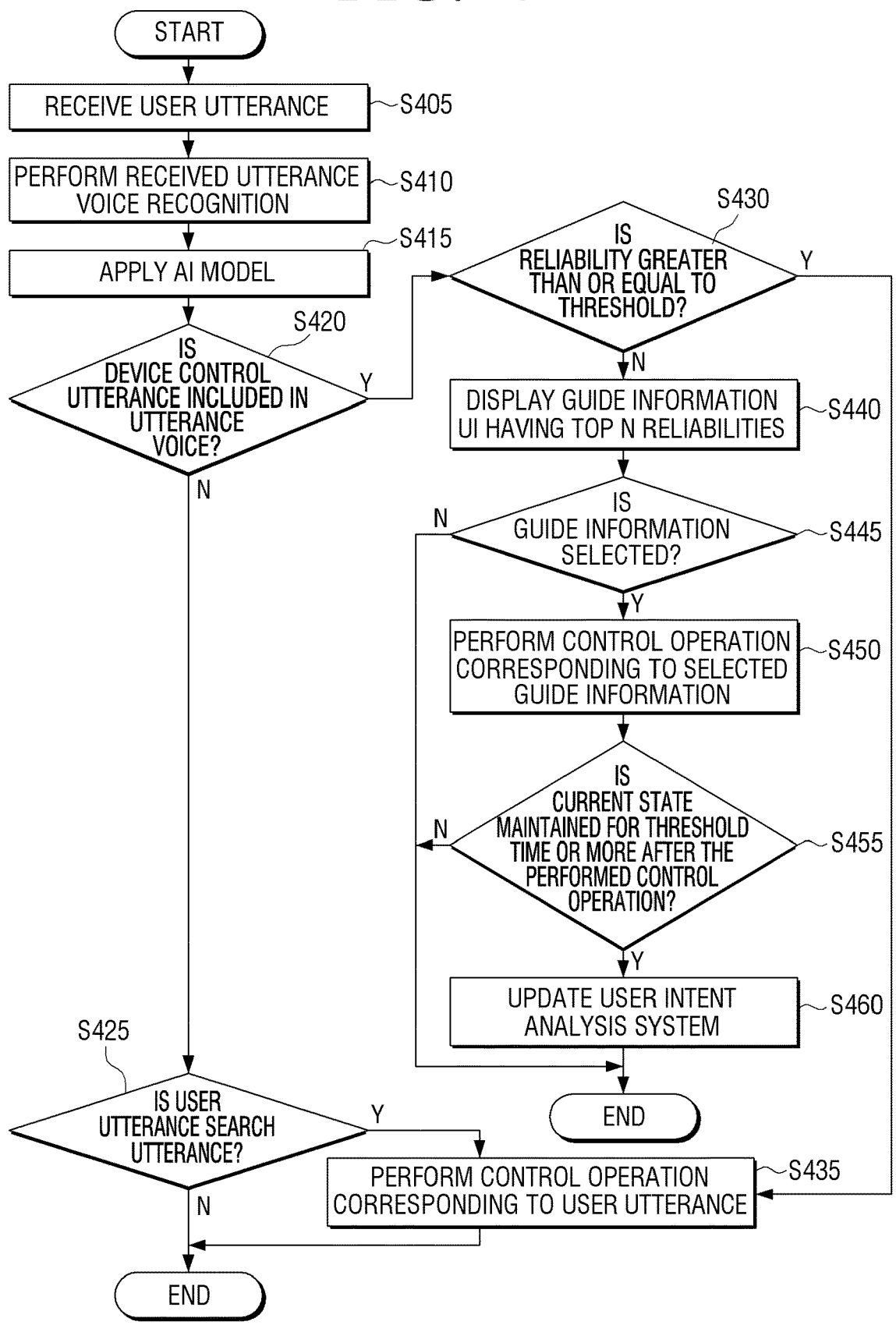
FIG. 4 is a flowchart illustrating an example operation to update a user intent analysis system by determining whether the user utterance corresponds to a device control utterance according to an embodiment.

FIG. 4 is a flowchart illustrating an example operation to update a user intent analysis system by determining whether the user utterance corresponds to a device control utterance according to an embodiment.

Referring to FIG. 4, the electronic apparatus 100 may receive user utterance in step S405, and obtain the intent analysis result related to the text information through the voice recognition operation in step S410. The electronic apparatus 100 may perform a voice recognition operation based on voice data of a user, and obtain at least one of a plurality of intent analysis results including text information corresponding to the voice data.

The electronic apparatus 100 may apply the intent analysis result to the AI model as the input value in step S415 (The electronic apparatus 100 may input the intent analysis result to the AI model for using the input value). The AI model may receive information on the text information or information on the intent analysis result, and output a result whether to correspond to the device control utterance.

The electronic apparatus 100 may identify whether a user utterance corresponds to a device control utterance, using the AI model in step S420. If the electronic apparatus 100 applies an AI model and identifies that the user's utterance is not included in the device control utterance ("No" in operation S420), the electronic apparatus 100 may identify whether the user's utterance corresponds to the search utterance in step S425.

If the electronic apparatus 100 determines that a device control utterance is included in the uttered voice of a user ("Yes" in operation S420), the reliability of the values output from the AI model may be calculated in step S430. The reliability may refer, for example, to a probability value output from the AI intelligence model which may correspond to a result desired by a user. When the electronic apparatus 100 determines that the user utterance corresponds to the device control utterance using the AI model, the electronic apparatus 100 may calculate the reliability and double check the device control utterance, and accordingly, accuracy may be improved (the electronic apparatus 100 may calculate the reliability twice).

When the reliability of the output values of the AI model is greater than or equal to a predetermined threshold value ("Yes" in operation S430), the electronic apparatus 100 may perform a control operation corresponding to the user utterance in step S435. For example, the operation corresponding to the user utterance may be the device control utterance.

If the reliability of the output values of the AI model is equal to or lower than a predetermined threshold value ("No" in operation S430), the electronic apparatus 100 may display a UI including N guide information with higher reliabilities in step S440. For example, that the output value of the AI model has reliability which is equal to or less than the predetermined threshold value may refer, for example, to a situation in which the electronic apparatus 100 may not identify the result intended by the user. Therefore, the electronic apparatus 100 may display a UI to identify what is the user's intent.

For example, when the reliability of the intent analysis result is identified to be less than or equal to a predetermined threshold, the electronic apparatus 100 may display the intent analysis result as a UI and identify the user's intent. By identifying the user's intent, the electronic apparatus 100 may identify whether the intent analysis result which falls short of the reliability standard corresponds to the device control utterance.

The electronic apparatus 100 may identify the intent analysis results having top N reliability, when there are the plurality of intent analysis results and the reliability of the plurality of intent analysis results is less than or equal to the threshold value. The electronic apparatus 100 may display the guide information corresponding to the intent analysis result of top N reliability with the UI. For example, the guide information may correspond to information describing an operation or function to be controlled by the electronic apparatus 100 with respect to the intention analysis result. The number N may be changed by user setting.

An example operation of displaying the guide information will be described in greater detail below with reference to FIGS. 5, 6 and 7.

The electronic apparatus 100 may identify whether the user selects specific guide information from the displayed UI in step S445. If the user does not select any guide information ("No" in operation S445), the electronic apparatus 100 may terminate the processing of the user utterance.

If the user selects specific guide information from among N guide information included in the UI ("Yes" in operation S445), the electronic apparatus 100 may perform a control operation corresponding to the selected guide information in step S450.

The electronic apparatus 100 may identify whether the current state is maintained for a threshold time or more after the performed control operation in step S455. If it is identified that the current state is not maintained for a threshold time by the user (If it is identified that the current state is changed for a threshold time by the user) ("No" in operation S455), the electronic apparatus 100 may terminate a processing for the user utterance.

The electronic apparatus 100 may update the user's intent analysis system if it is identified that the user maintains a current state longer than the threshold time ("Yes" in operation S455) in step S460. For example, the electronic apparatus 100 may identify that the guide information selected by the user corresponds to the user utterance. Here, the threshold time may be changed by the user. The user utterance corresponding to the guide information selected by the user may be text information about the user utterance. For example, in the embodiment in which the user utters "Execute number 11", it is assumed that the text information corresponds to "Execute number 11" and the user selects guide information "Show channel number 11". The electronic apparatus 100 may execute a control command to change the current screen to channel number 11. When the user maintains the changed channel 11 for the threshold time, the electronic apparatus 100 may map the text information ("Execute number 11") uttered by the user and the guide information selected by the user ("Show channel number 11"). For example, the mapped guide information may not be contextual information such as "Show channel number 11," but may be a control command corresponding to moving to channel number 11. This mapping operation may be to update the user intent analysis system and store the updated user intention analysis system in the memory 110.

An example embodiment of the operation of identifying whether the user maintains the current state for a threshold time will be described in greater detail below with reference to FIG. 6.

As described above, the processing speed of the electronic apparatus 100 may be accelerated when the user utters "Execute number 11" again after the user intent analysis system is updated. For example, when the user utters "Execute number 11", the electronic apparatus 100 may directly determine the user utterance as device control utterance, and identify the reliability of the intent analysis result corresponding to "moving to channel number 11" to be greater than or equal to a threshold.

Accordingly, if the uttered voice is analyzed by reflecting the operation selected by the user is analyzed, the user's intent may be reflected and the processing speed for the user utterance may be enhanced.

Figure 5:
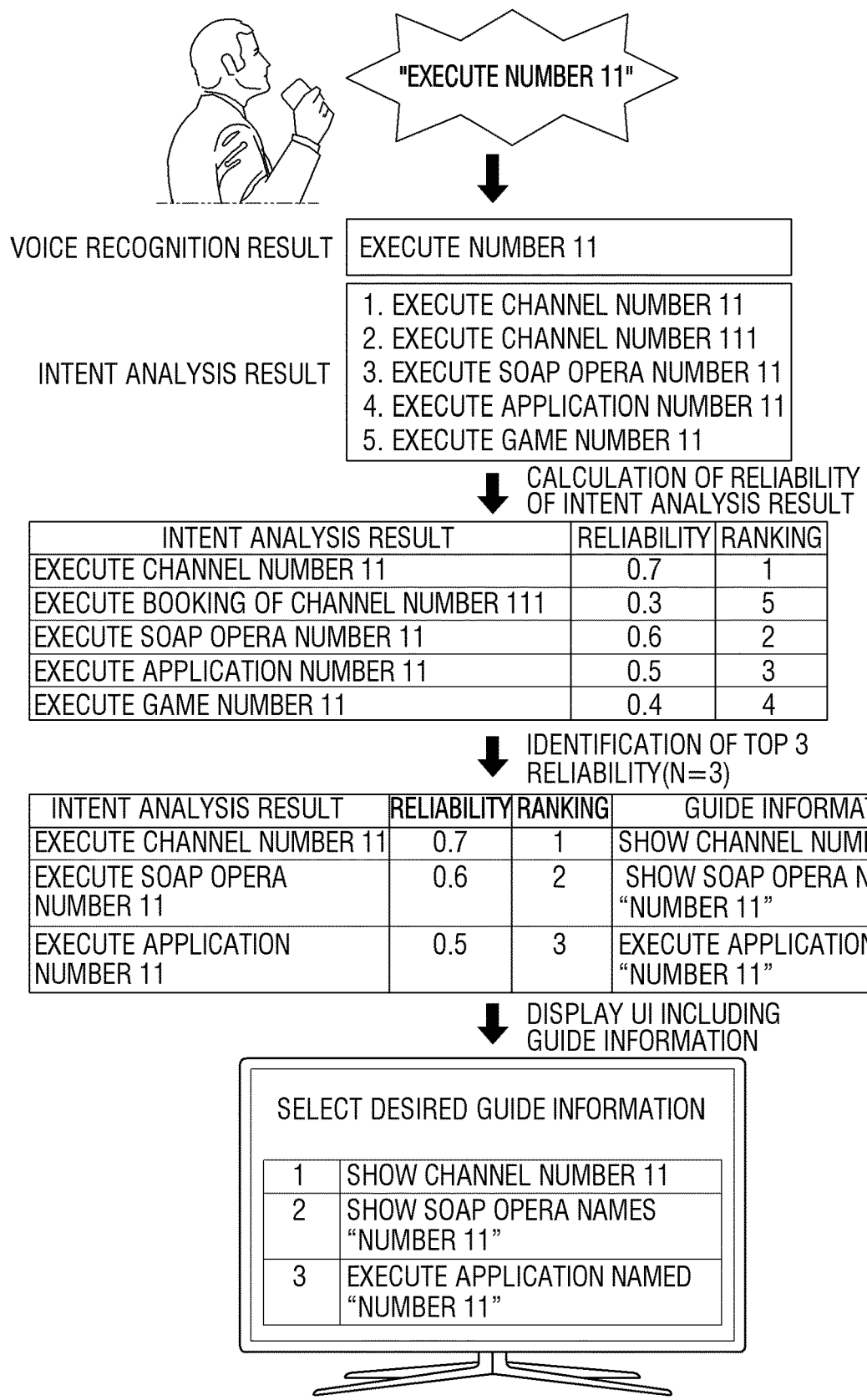
FIG. 5 is a diagram illustrating an example method for generating a UI including guide information by an electronic apparatus according to an embodiment.

FIG. 5 is a diagram illustrating an example method for generating a UI including guide information by an electronic apparatus according to an embodiment.

Referring to FIG. 5, a diagram illustrating an example method for generating a UI including the guide information.

For example, if the user utters "Execute number 11", the text information may be "execute number 11". For example, the electronic apparatus 100 may perform a speech recognition operation to obtain text information of "Execute number 11." That is, the text information "Execute number 11" may correspond to speech recognition results. The electronic apparatus 100 may then perform the intent analysis operation using the obtained text information. The intent analysis operation may correspond to an operation of guessing a user's intent related to the obtained text information. The intent analysis result may be at least one of a control operation that may be performed and information that may be provided based on the obtained text information.

For example, the plurality of intent analysis results may be "Execute channel 11," "Execute channel number 111," "Execute soap opera number 11," "Execute application number 11," and "Execute game number 11." All the plurality of intent analysis results include text information of "Number 11" and "Execute," but may mean different control operations (functions), respectively.

For example, all the reliability of a plurality of intent analysis results may be less than or equal to a predetermined threshold. The predetermined threshold is assumed to be 0.8. Referring to FIG. 5, since all five intents analysis results do not exceed a predetermined threshold of 0.8 and thus, the electronic apparatus 100 may not immediately execute a control operation corresponding to the user utterance.

The electronic apparatus 100 may identify the intent analysis results with top N reliabilities. For example, it is assumed that N is three (3). The electronic apparatus 100 may identify the intent analysis result with top N reliabilities, from among five intent analysis results.

The guide information corresponding to the top three intention analysis results may be identified. For example, the guide information of "Execute channel number 11" may be "Show channel number 11". The guide information of "Execute soap opera number 11" may be "Show a soap opera named 'number 11'." The guide information of "Execute application 11" may be "Execute an application named 'number 11'".

The context of the intention analysis result may be different from the context of the guide information. The context of the intention analysis result may be a context including text information uttered by a user. In addition, the context of the guide information may be a context in which a control operation of an actual electronic apparatus 100 is included.

The electronic apparatus 100 may obtain the guide information corresponding to three intent analysis results and provide the obtained guide information with a UI to a user.

The electronic apparatus 100 may include a display, and display a UI including the guide information described above in the display to induce a user's selection. By inducing a user's selection, an accurate intent of the use utterance may be identified.

In FIG. 5, an intent analysis result including "Number 11" and "Execute" is illustrated. However, in actual implementation, various intent analysis results including text similar to text information may be obtained depending on the type of the voice recognition module. For example, if it is assumed that the text information is "Execute number 11," the intent analysis result of excluding "number" such as "execute the current sound volume to 11" may be obtained.

Figure 6:
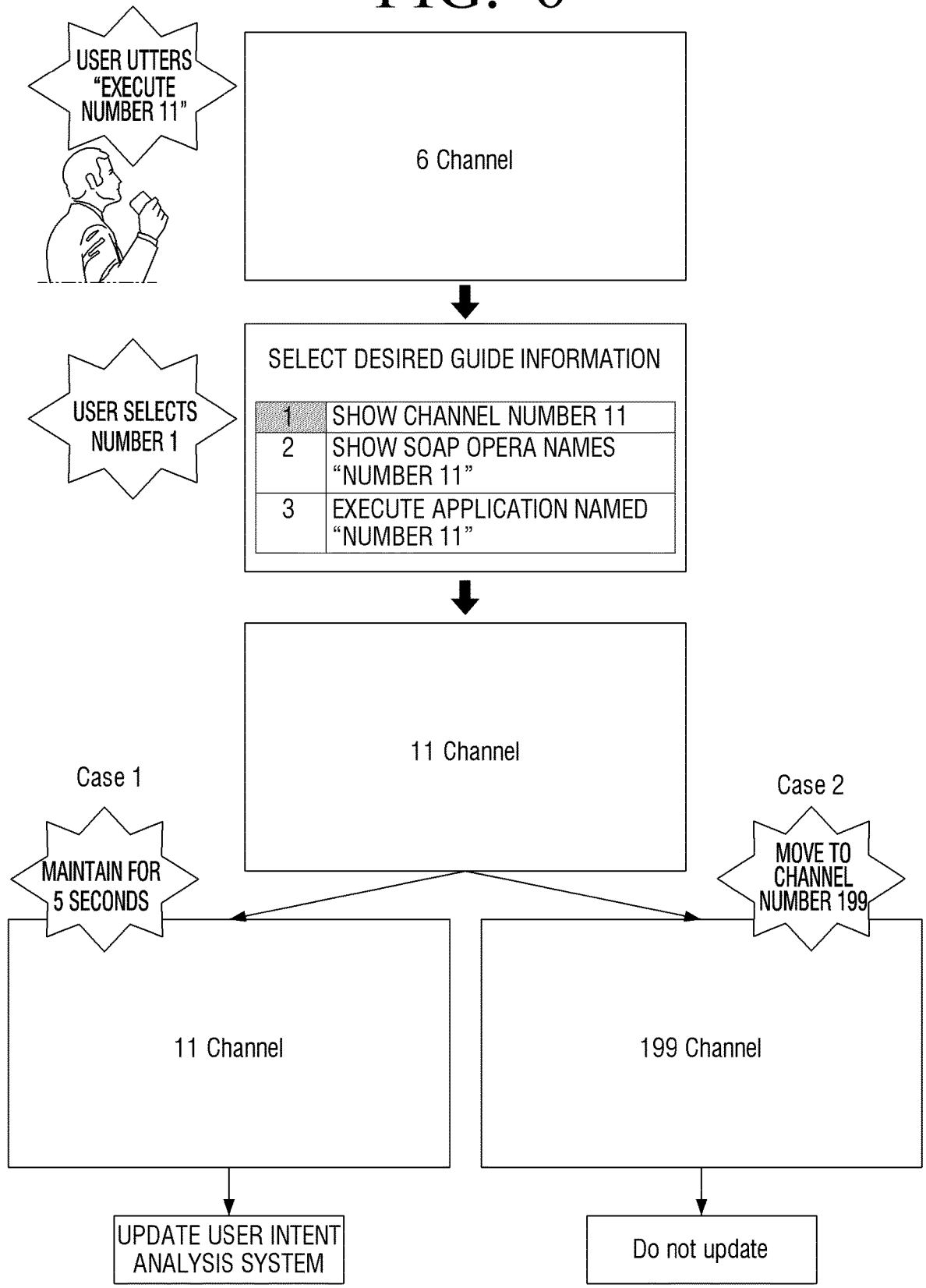
FIG. 6 is a diagram illustrating an example operation of updating a user intent analysis system according to a use history of a user according to an embodiment.

FIG. 6 is a diagram illustrating an example operation of updating a user intent analysis system according to a use history of a user.

Referring to FIG. 6, an embodiment in which the user selects and maintains specific guide information from among a plurality of guide information included in the UI for a threshold time is described.

When the user utters "Execute number 11", the electronic apparatus 100 may generate a UI including three guide information as described in FIG. 5. Here, the user may select the guide information corresponding to "Show channel number 11." The electronic apparatus 100 may generate and execute a control command corresponding to the guide information selected by the user. That is, the electronic apparatus 100 may move to the channel number 11 selected by the user from channel number 6 which has been displayed previously.

When the user maintains channel number 11 for five seconds (predetermined threshold time), the electronic apparatus 100 may update the user intent analysis system. The electronic apparatus 100 may identify that the action of the user to watch changed channel number 11 for five seconds corresponds to that the guide information (Show channel number 11) selected by the user corresponds to the user intent. Accordingly, the electronic apparatus 100 may map "Execute number 11" which is the text information of the user utterance (or voice) with "Show channel number 11" which is the guide information selected by the user.

For example, the electronic apparatus 100 may map the "Execute number 11" of text information and the control command of "Show channel number 11", which is guide information selected by the user. The guide information selected by the user "Show channel number 11" may include a control command "moving to channel number 11." Accordingly, the electronic apparatus 100 may map text information ("Execute number 11") and a control command ("moving to channel number 11").

After the electronic apparatus 100 performs the mapping operation as described above, if the user utters "Execute number 11" again, the electronic apparatus 100 may perform a control operation of "Moving to channel number 11" immediately, without the aforementioned process.

If the user may not maintain channel 11 for five seconds (predetermined threshold time), the electronic apparatus 100 may not update the user intent analysis system. For example, the electronic apparatus 100 may display the channel number 11 based on the guide information ("Show channel number 11") selected by the user. For example, when the user moves to another channel (channel number 199) within five seconds, the electronic apparatus 100 may determine that the guide information ("Show channel number 11") selected by the user is not an operation intended by the user.

When a voice uttered by the user is not recognized as a direct control operation, the electronic apparatus 100 may generate a UI to grasp the intent of the user. If the user selects the guide information included in the UI, the selected guide information may be highly likely to correspond to the control operation intended by the user. However, in order to prepare for a case when the selection of the user is wrong, the electronic apparatus 100 may identify whether the changed operation state (Show channel number 11) has been maintained for a threshold time. Referring to FIG. 6, the electronic apparatus 100 may identify whether channel number 11 is maintained for five seconds. If channel number 11 is maintained for five seconds, the electronic apparatus 100 may identify that the guide information selected by the user matches the intent of the user. In addition, when the user moves to another channel within five seconds, the electronic apparatus 100 may identify that the guide information selected by the user does not match the intent of the user. Therefore, a separate user intent analysis system may not be updated.

Figure 7:
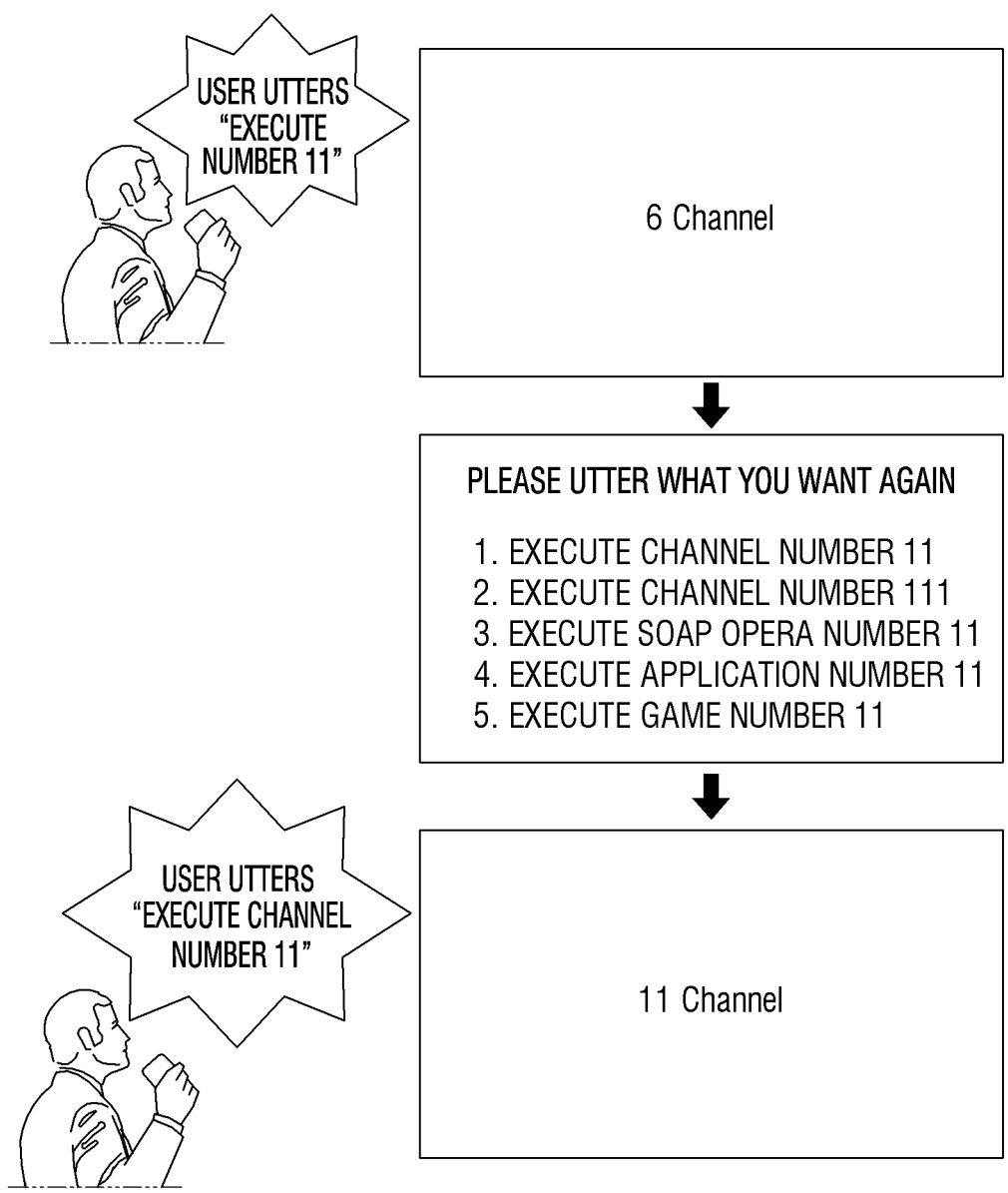
FIG. 7 is a diagram illustrating an example method for identifying a user intent by an electronic apparatus according to still another embodiment.

FIG. 7 is a diagram illustrating an example method for identifying a user intent by an electronic apparatus according to still another embodiment.

FIG. 7 is a diagram illustrating an example method for generating a UI of the electronic apparatus 100 according to still another embodiment.

If the user utters "Execute number 11," the electronic apparatus 100 may generate a UI for guiding that the user utters again what the user wants. The electronic apparatus 100 may display the intent analysis result as the UI. The electronic apparatus 100 may generate the UI for guiding to induce that the user utters the intent analysis result once again.

Referring to FIG. 7, the electronic apparatus may generate a UI which displays five items obtained as the result of the intent analysis. If the user utters "Execute channel number 11," the electronic apparatus 100 may recognize the utterance and perform an operation to change the channel to number 11.

In FIGS. 5, 6 and 7, it has been described that the user utters using an external device (external remote controller) including a microphone. However, in actual implementation, the user utterance may be received directly by the electronic apparatus 100 without using the electronic device (external remote controller). Here, the electronic apparatus 100 may further include a microphone.

Figure 8:
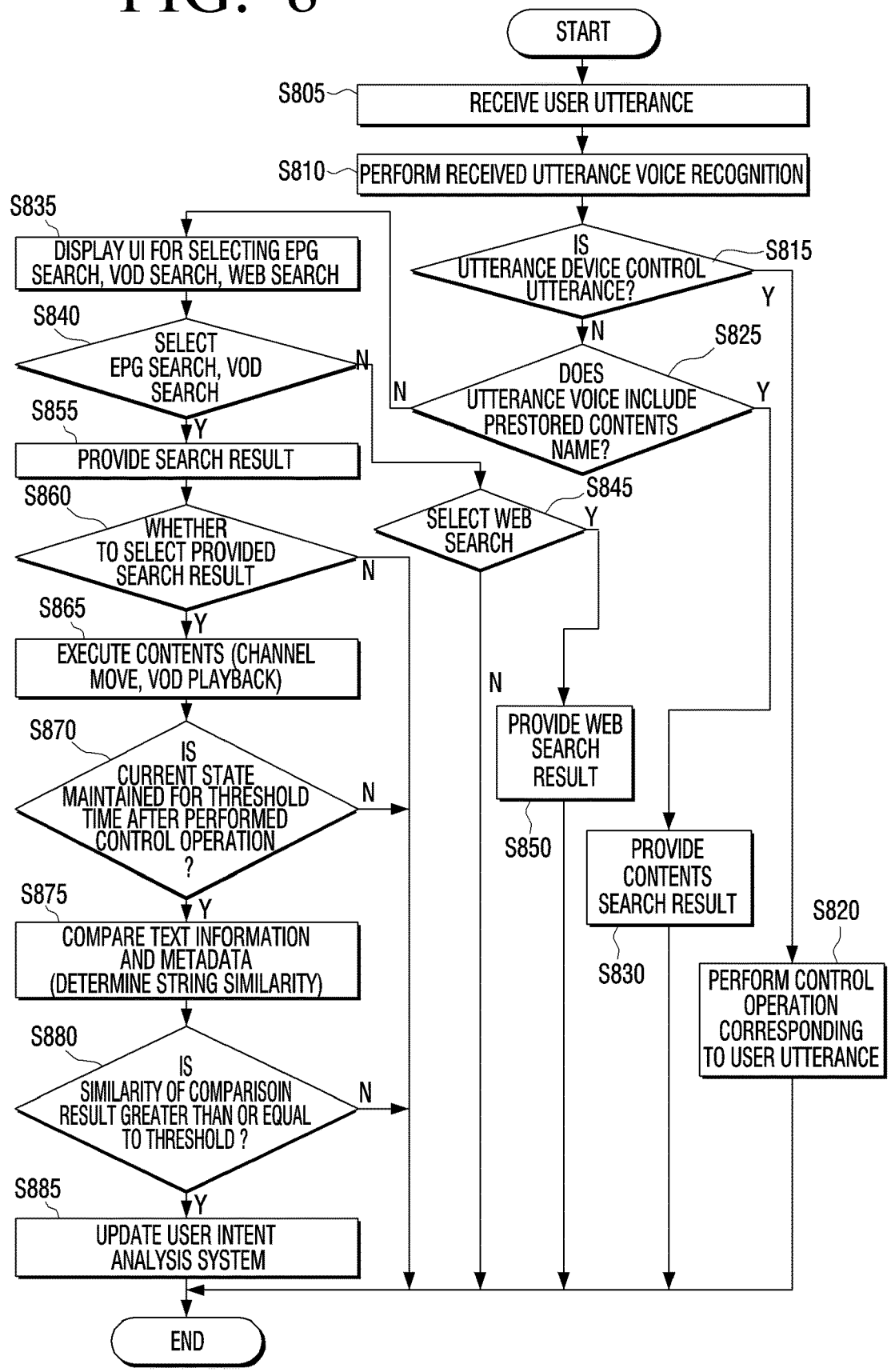
FIG. 8 is a flowchart illustrating an example operation to perform a search function based on user utterance according to an embodiment.

FIG. 8 is a flowchart illustrating an example operation to perform a search function based on user utterance according to an embodiment.

FIG. 8 illustrates an example operation which is performed when the electronic apparatus 100 identifies that the intent analysis result does not correspond to the device control utterance.

The electronic apparatus 100 may receive the utterance of the user in step S805, and perform a voice recognition operation for the received utterance in step S810. The electronic apparatus 100 may identify whether the user utterance is utterance for device control (hereinafter, device control utterance) using the obtained intent analysis result in step S815. The operation of identifying whether the utterance is the device control utterance has been described in FIG. 4.

When the user utterance corresponds to the device control utterance ("Yes" in operation S815), the electronic apparatus 100 may perform a control operation corresponding to the user utterance in step S820.

The electronic apparatus 100, if it is identified that the intent analysis result does not correspond to the device control utterance ("No" in operation S815), may identify whether a name of prestored contents is included in the intent analysis result (uttered voice) in step S825. When a name pre-stored contents is included in the intent analysis result ("Yes" in operation S825), the electronic apparatus 100 may provide the contents search result to the user in step S830. For example, the contents search may refer, for example, to the search which targets an electronic program guide (EPG) data or search which targets video on demand (VOD) data. That the electronic apparatus 100 pre-stored the name of contents may refer, for example, to a situation in which the user frequently searches for the corresponding contents name. Therefore, if a name of the pre-stored contents is included in the user utterance, the electronic apparatus 100 may perform the EPG search or VOD search immediately and provide the user with the search result, without displaying a specific UI.

For example, it is assumed that the contents pre-stored in the memory 110 are a, b, c, and d. When the user utters "Execute A", the electronic apparatus 100 may directly provide the user with the search result for the contents A, without displaying a separate UI to the user. By performing the EPG search or the VOD search for the contents A, each result may be provided to a user. The EPG search result may include information of a current channel in which the content A is being broadcasted or information of a channel with a scheduled broadcasting. The VOD search result may refer, for example, to providing a UI screen capable of watching the content A.

There may be a case where the user utters the name of the content which is not the pre-stored content. For example, it is assumed that E is not a keyword pre-stored in the memory 110. When the user utters "Execute E," the electronic apparatus 100 may not identify whether E is a content or not. Therefore, the electronic apparatus 100 may identify that the word "E" uttered by the user is a new content that is not stored. More specifically, the electronic apparatus 100 may display a UI asking whether to perform a search operation with respect to the word E uttered by the user.

The electronic apparatus 100 may generate a UI for selecting the EPG search, VOD search, and web search based on the intent analysis result in step S835. For example, the EPG search is to perform a search operation in EPG data received from an external server. In addition, the VOD search may be to perform a search operation in VOD content information provided by an external server. In addition, the web search is to perform a search operation through at least one web browser. The electronic apparatus 100 may use a predetermined web browser when performing the web search. In the meantime, the user may generate a UI for selecting one of a plurality of web browsers. When the user selects a specific web browser, the electronic apparatus 100 may perform a web search using the selected web browser.

The electronic apparatus 100 may identify whether the user has selected the EPG search or the VOD search in step S840. In addition, when the user does not select the EPG search or the VOD search ("No" in operation S840), the electronic apparatus 100 may identify whether the user selects the web search in step S845. For example, if the user does not select the web search ("No" in operation S845), the electronic apparatus 100 may terminate the processing with respect to the user utterance. On the other hand, when the user selects the web search ("Yes" in operation S845), the electronic apparatus 100 may perform the web search operation using a predetermined web browser, and provide the user with the web search result in step S850.

When the user selects the EPG search or the VOD search ("Yes" in operation S840), the electronic apparatus 100 may provide the user with the result of the EPG search and the VOD search in step S855.

The electronic apparatus 100 may generate a UI asking the user whether to select the corresponding result, and identify whether the user selects the provided search result in step S860.

When the user does not select the content for the search result ("No" in operation S860), the electronic apparatus 100 may terminate the processing with respect to the user utterance. When the user selects the content for the search result ("Yes" in operation S860), the electronic apparatus 100 may execute the selected content in step S865. Executing the content may refer, for example, to moving to a specific channel providing the corresponding content or moving to the VOD service item through which the user may view the corresponding content.

According to another embodiment, the electronic apparatus 100 may execute the content directly, without asking whether to select the provided search result. For example, in the embodiment in which the user utters "Execute E," if the user selects the EPG search, the electronic apparatus 100 may identify whether there is a channel or a program of "E" in the EPG data received from an external server. The electronic apparatus 100, when only one channel or program exists, may directly move to a specific channel providing the E channel or E program.

After executing the channel or the program selected by the user, the electronic apparatus 100 may identify whether a current state is maintained for a threshold time or more in step S870. For example, if the user identifies that the current state is not maintained for a threshold time ("No" in operation S870), the electronic apparatus 100 may terminate the processing with respect to the user utterance. The action that does not maintain the current state may correspond to changing the channel or executing other contents.

If it is identified that the user maintains the current state for a threshold time ("Yes" in operation S870), the electronic apparatus 100 may update the user intent analysis system.

Additionally, before the electronic apparatus 100 updates the user intent analysis system, the electronic apparatus 100 may compare the string similarity between the uttered voice data (or the intent analysis result) and metadata (EPG data or VOD data) in step S875. More specifically, the string similarity between the text information of the intent analysis result based on the voice data uttered by the user and the content information of the metadata selected by the user in step S860 may be compared. For example, the electronic apparatus 100 may obtain the text information of the content selected by the user from the metadata, and compare the text information corresponding to a user utterance obtained as a result of the intent analysis.

The string similarity may refer, for example, to representation as a value indicating how similar one sentence is with another sentence. For example, the string similarity of "Hi bixby!" and "hi bixby!" may be 1. The string similarity between "Hi bixby" and "Hi dooby!" may be 0.5. The electronic apparatus 100 may use various string similarity programs to obtain the string similarity.

The electronic apparatus 100 may identify whether the string similarity is greater than or equal to a predetermined threshold in step S880. If the obtained string similarity is less than or equal to the predetermined threshold ("No" in operation S880), the electronic apparatus 100 may terminate the processing of the user utterance.

If the obtained character string similarity is greater than or equal to a predetermined threshold ("Yes" in operation S880), the electronic apparatus 100 may update the user intent analysis system in step S885. The electronic apparatus 100 may store the name of the content selected by the user in the memory 110. For example, the electronic apparatus 100 may store a name of E channel or E program as a predetermined content in the memory 110 as one of the update operation. After the electronic apparatus 100 stores the E content (channel or program) as a predetermined content and then utters "Execute E," the electronic apparatus 100 may identify that the prestored content is included in the uttered voice in step S825. Then, the electronic apparatus 100 may immediately execute the content corresponding to the uttered voice.

If the device control utterance is not included in the user utterance, the electronic apparatus 100 may perform a search function (operation), and the electronic apparatus 100 may grasp the user's intent through the steps S840, S860, and S870. The electronic apparatus 100 may identify whether the user's intent is correct in a dual manner through the step S880, to improve the accuracy.

Figure 9:
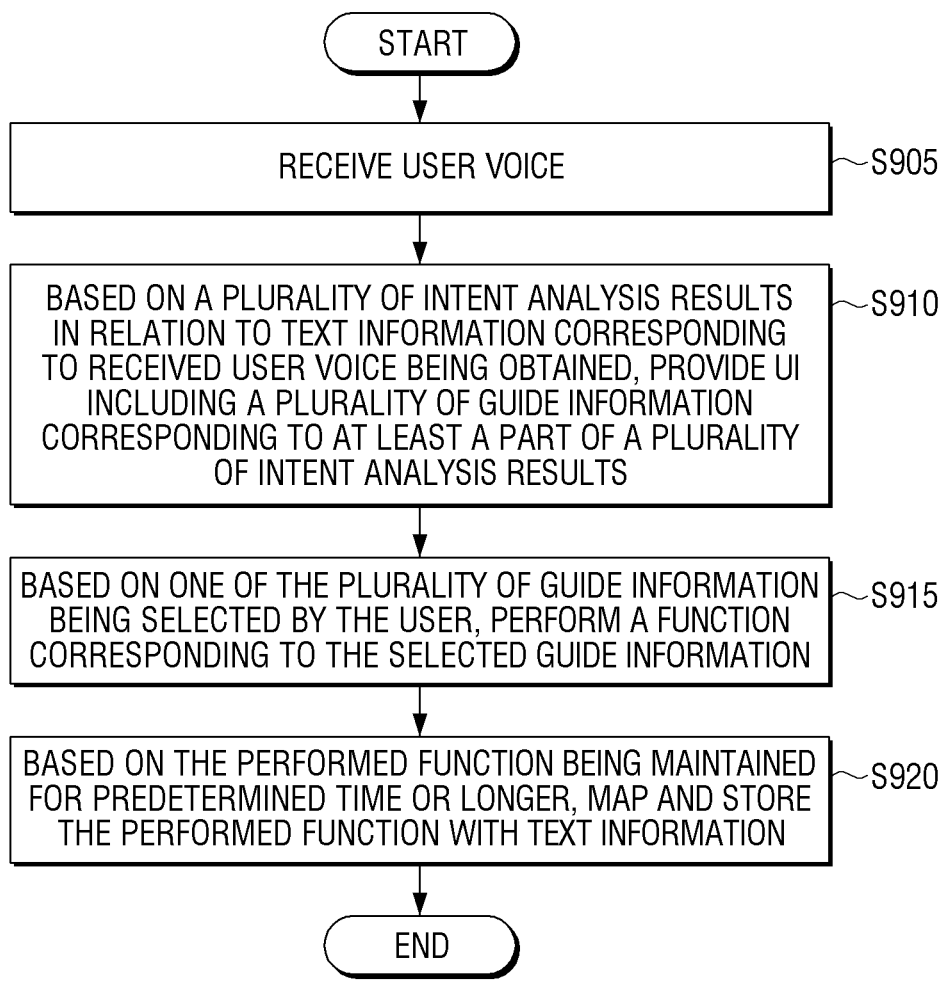
FIG. 9 is a flowchart illustrating an example method of controlling an electronic apparatus according to an embodiment.

FIG. 9 is a flowchart illustrating an example method of an electronic apparatus according to an embodiment.

In a method for controlling an electronic apparatus according to an embodiment, the electronic apparatus 100 may receive the user voice in step S905. The electronic apparatus 100, when a plurality of intent analysis results is obtained in relation to the text information corresponding to the received user voice, may generate a UI including a plurality of guide information corresponding to at least some of a plurality of intent analysis results in step S910. When one of the plurality of guide information is selected by the user, a function corresponding to the selected guide information may be performed in step S915. If the performed function is maintained for a predetermined time or more (If it is identified that the current state is not maintained for a threshold time), the performed function may be mapped with the text information and the mapping information may be stored in step S920.

For example, the step of performing a function corresponding to the selected guide information in step S915 may include, when one of the plurality of guide information is selected, performing a first function corresponding to the selected guide information, and when a user command corresponding to another one of the plurality of guide information is received within a predetermined time after the first function is performed, may perform a second function corresponding to the other guide information, and map the second function with the text information and store the mapping information.

For example, the method of controlling the electronic apparatus 100 may perform the first function corresponding to the selected guide information when one of the plurality of guide information is selected. When a first function is performed and a user command corresponding to a third function not included in a plurality of guide information is received within a predetermined time, the third function may be performed, and the third function may be mapped with text information and stored.

The method of controlling the electronic apparatus 100 may further include obtaining a reliability value for each of the plurality of intent analysis results obtained in association with the text information, and the step of generating a UI may generate a UI including a plurality of guide information corresponding to a part of the plurality of intent analysis results based on the size of the obtained reliability value.

Also, the step of generating a UI in step S910 may, when the reliability value for any one of the plurality of intent analysis results is greater than or equal to a predetermined threshold, perform a function corresponding to the result of the intent analysis, and if the reliability value of each of the plurality of the intent analysis results is less than a predetermined threshold, a UI including a plurality of guide information may be generated.

The step of obtaining the reliability value may, when it is identified that the text information relates to the device control, obtain the reliability value for each of the plurality of intent analysis results obtained in relation to the text information.

The method of controlling the electronic apparatus 100 may, when it is not identified that the text information is related to the device control, identify that the information related to the pre-stored content is included in the text information.

In addition, the step of generating a UI in step S910 may, if the text information does not include information related to the content, generate a UI including a plurality of guide information related to the search type based on the text information.

The method of controlling the electronic apparatus 100 may perform search for the text information based on the selected guide information among the plurality of guide information. For example, the string similarity value between the search result and the text information may be obtained.

The step of mapping the performed function with the text information and storing the mapping information in step S920 may, when the string similarity value is greater than or equal to a predetermined value, map the search result with the text information and store the mapping information.

The methods according to various embodiments as described above may be implemented as an application format which may be installed in a conventional electronic apparatus.

The methods according to various embodiments as described above may be implemented by software upgrade or hardware upgrade for the conventional electronic apparatus.

The various embodiments as described above may be performed through an embedded server provided in the electronic apparatus or an external server of the electronic apparatus.

The method of controlling the electronic apparatus according to an embodiment as described above may be implemented as a program and provided in the electronic apparatus. For example, a program including the electronic apparatus controlling method may be stored in a non-transitory computer readable medium and provided.

In a non-transitory computer readable medium storing computer instructions when executed by a processor may cause the electronic apparatus to perform operations, the operations may receive a user voice. When a plurality of intent analysis results is obtained in relation to the text information corresponding to the received user voice, a UI including a plurality of guide information corresponding to at least a part of a plurality of intent analysis results may be generated. When one of the plurality of guide information is selected by a user, a function corresponding to the selected guide information may be performed. If the performed function is maintained for a predetermined time or more, the performed function may be mapped with the text information, and the mapping information may be stored.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided While the disclosure has been described with reference to various example embodiments, the various example embodiments of the disclosure are intended to be illustrative, not limiting, and many alternatives, modifications, and variations will be apparent to those skilled in the art.

What is claimed is:

1. An electronic apparatus, comprising:
a memory; and
a processor configured to control the electronic apparatus to:
provide a user interface (UI) including a plurality of guide information corresponding to at least a part of a plurality of intent analysis results based on a plurality of intent analysis results in relation to text information corresponding to a user voice being obtained,
perform a first function corresponding to selected guide information based on one of the plurality of guide information being selected,
control the memory to store mapping information between the performed first function and the text information based on the performed first function being maintained for a predetermined time or more,
perform a second function corresponding to another guide information based on at least a command corresponding to another one of the plurality of guide information being received within a predetermined time after the first function is performed, and
control the memory to store mapping information between the second function and the text information based on the command corresponding to another one of the plurality of guide information being received within the predetermined time after the first function is performed.

2. The electronic apparatus of claim 1,
wherein the processor is further configured to control the electronic apparatus to:
perform a third function based on a command corresponding to a third function not included in the plurality of guide information being received within a predetermined time after the first function is performed, and
control the memory to store mapping information between the third function and the text information.

3. The electronic apparatus of claim 1,
wherein the processor is configured to control the electronic apparatus to:
obtain a reliability value for each of a plurality of intent analysis results obtained in relation to the text information, and
provide a UI including a plurality of guide information corresponding to the part of the plurality of intent analysis results from among the plurality of intent analysis results, based on the size of the obtained reliability value.

4. The electronic apparatus of claim 3,
wherein the processor is configured to control the electronic apparatus to:
execute a function corresponding to the intent analysis results based on a reliability value for any one of the plurality of intent analysis results being greater than or equal to a predetermined threshold, and
provide a UI including the plurality of guide information based on a reliability value of each of the plurality of intent analysis results being less than the predetermined threshold.

5. The electronic apparatus of claim 3,
wherein the processor is configured to control the electronic apparatus to obtain a reliability value for each of the plurality of intent analysis results that are obtained in relation the text information based on the text information being identified to be related to device control.

6. The electronic apparatus of claim 3,
wherein the processor is configured to control the electronic apparatus to:
identify whether the text information includes information related to prestored content based on the text information not being identified to be related to device control, and
provide a UI including a plurality of guide information related to a search type based on the text information based on the text information not including information related to the content.

7. The electronic apparatus of claim 6,
wherein the processor is further configured to control the electronic apparatus to:
perform a search for the text information based on selected guide information from among the plurality of guide information,
obtain a string similarity value of a search result and the text information, and
control the memory to store mapping information between the search result and the text information based on the string similarity value being greater than or equal to a predetermined value.

8. The electronic apparatus of claim 6,
wherein the search type comprises at least one of a web search, a video on demand (VOD) search, and an electronic program guide (EPG) search.

9. The electronic apparatus of claim 3,
wherein the processor is configured to control the electronic apparatus to:
identify whether the text information includes information related to prestored content based on the text information not being identified to be related to device control, and
provide a UI including a plurality of guide information related to a type of the content based on the text information including information related to the content.

10. The electronic apparatus of claim 1, further comprising:
a display,
wherein the processor is configured to control the display to display a UI including the plurality of guide information.

11. A method of controlling an electronic apparatus, the method comprising:
receiving a user voice;
obtaining a plurality of intent analysis results in relation to text information corresponding to a user voice;
providing a user interface (UI) including a plurality of guide information corresponding to at least a part of the plurality of intent analysis results;
performing a first function corresponding to selected guide information based on one of the plurality of guide information being selected; and
storing mapping information between the performed first function and the text information based on the performed first function being maintained for a predetermined time or more;
performing a second function corresponding to another guide information based on at least a command corresponding to another one of the plurality of guide information being received within a predetermined time after the first function is performed; and
storing mapping information between the second function and the text information based on the command corresponding to another one of the plurality of guide information being received within the predetermined time after the first function is performed.

12. The method of claim 11, further comprising:
performing a third function based on a command corresponding to a third function that is not included in the plurality of guide information being received within a predetermined time after the first function is performed, and mapping the third function with the text information and storing mapping information between the third function and the text information.

13. The method of claim 11, further comprising:
obtaining a reliability value for each of a plurality of intent analysis results obtained in relation to the text information,
wherein the providing the UI comprises providing a UI including a plurality of guide information corresponding to the part of the plurality of intent analysis results, from among the plurality of intent analysis results, based on the size of the obtained reliability value.

14. The method of claim 13,
wherein the providing the UI comprises:
executing a function corresponding to the intent analysis results based on a reliability value for any one of the plurality of intent analysis results being greater than or equal to a predetermined threshold, and
providing a UI including the plurality of guide information based on a reliability value of each of the plurality of intent analysis results being less than the predetermined threshold.

15. The method of claim 13,
wherein the obtaining a reliability value comprises obtaining a reliability value for each of the plurality of intent analysis results that are obtained in relation the text information, based on the text information being identified to be related to device control.

16. The method of claim 13, further comprising:
identifying whether the text information includes information related to prestored content based on the text information not being identified to be related to device control,
wherein the providing the UI comprises providing a UI including a plurality of guide information related to a search type based on the text information based on the text information not including information related to the content.

17. The method of claim 16, further comprising:
performing a search for the text information based on selected guide information from among the plurality of guide information;

obtaining a string similarity value of a search result and the text information; and storing mapping information between the search result and the text information based on the string similarity value being greater than or equal to a predetermined value.

18. A non-transitory computer readable medium having stored thereon computer instructions which, when executed by a processor of an electronic apparatus cause the electronic apparatus to perform operations including:

receiving a user voice;

obtaining a plurality of intent analysis results in relation to text information corresponding to a user voice;

providing a user interface (UI) including a plurality of guide information corresponding to at least a part of the plurality of intent analysis results;

performing a first function corresponding to selected guide information based on one of the plurality of guide information being selected;

storing mapping information between the performed first function and the text information based on the performed first function being maintained for a predetermined time or more;

performing a second function corresponding to another guide information based on at least a command corresponding to another one of the plurality of guide information being received within a predetermined time after the first function is performed; and storing mapping information between the second function and the text information based on the command corresponding to another one of the plurality of guide information being received within the predetermined time after the first function is performed.

* * * * *